United States Patent [19]

Rathburn

[11] 4,105,215

[45] Aug. 8, 1978

[54] WELL PACKER INCLUDING COMBINATION ANTI-EXTRUSION AND SEGMENT RING ACTUATING WASHER

[75] Inventor: Lloyd C. Rathburn, Friendswood, Tex.

[73] Assignee: Loomis International, Inc., Houston, Tex.

[21] Appl. No.: 830,613

[22] Filed: Sep. 6, 1977

[51] Int. Cl.² .................... F16L 21/04; E21B 33/128
[52] U.S. Cl. .................................. 277/116.2; 166/187; 277/180; 277/198; 277/104; 277/188 A; 277/193
[58] Field of Search ................................ 277/102–104, 277/116.2, 180, 188 R, 188 A, 192, 193, 195, 198, 199, 235 R; 166/187

[56] References Cited

U.S. PATENT DOCUMENTS

| | | | |
|---|---|---|---|
| 2,797,759 | 7/1957 | Long et al. | 277/188 R |
| 2,851,291 | 9/1958 | Payne | 277/102 X |
| 3,158,378 | 11/1964 | Loomis | 277/198 |
| 3,195,645 | 7/1965 | Loomis | 277/116.2 |
| 3,288,222 | 11/1966 | Urbanosky | 277/116.2 X |

*Primary Examiner*—Robert S. Ward, Jr.
*Attorney, Agent, or Firm*—Frank S. Vaden, III

[57] ABSTRACT

A packer assembly for sealing against the wall of well pipe including a washer having reverse beveled and beveled faces. The reverse beveled face is adjacent to a straight resilient packer face, and the internal gap created thereby retards vertical extrusion of the resilient packer section under pressure. The beveled face abuts a radially expanding segmented packer ring, causing the packer ring to expand against the well pipe when the packer assembly is operated, thereby limiting vertical extrusion of the resilient packer section under high pressure conditions.

5 Claims, 2 Drawing Figures

U.S. Patent     Aug. 8, 1978     4,105,215
FIG. 1
FIG. 2
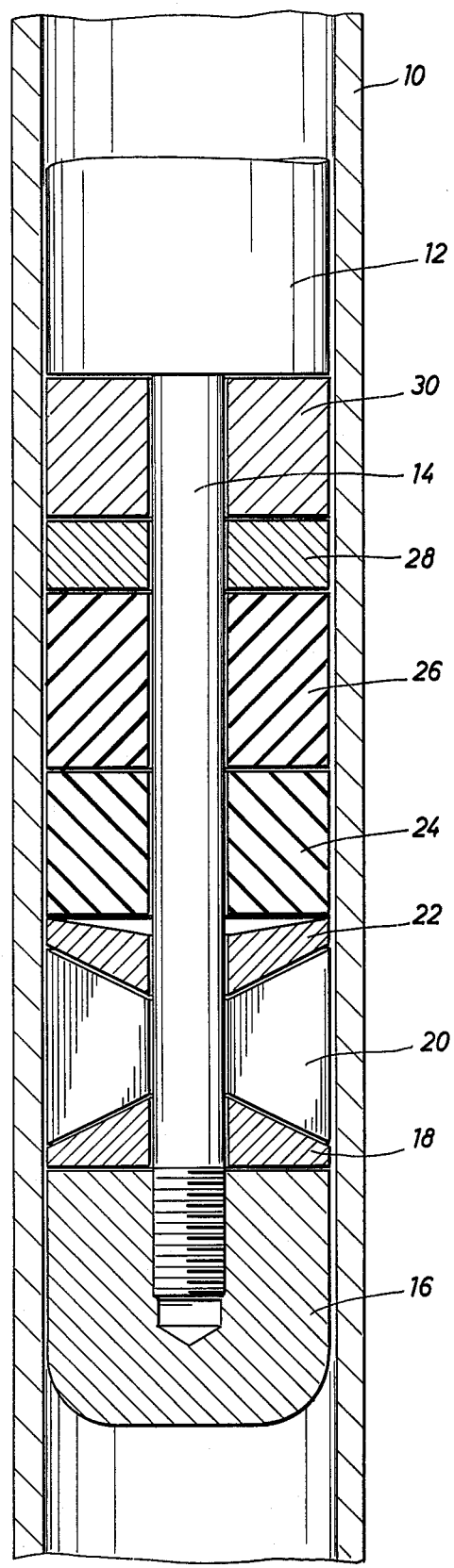
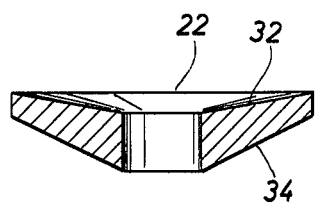

WELL PACKER INCLUDING COMBINATION ANTI-EXTRUSION AND SEGMENT RING ACTUATING WASHER

CROSS REFERENCE TO RELATED APPLICATION

A related invention is disclosed in my application entitled "Well Packer Including Anti-Extrusion Washer", Ser. No. 814,290, filed July 11, 1977.

BACKGROUND OF THE INVENTION

1. Field of the Invention

This invention relates to well pipe packers and more specifically to apparatus for retarding the extruding action of resilient material in such packers, which action in the prior art structure resulted in shortened packer life and occasional packer failure.

2. Description of the Prior Art

The walls of well pipe or casing are plugged or packed off, from time to time, for a number of reasons. For example, a section of well pipe may be packed off to permit pressuring the section to detect leaks in the wall of the well pipe. The structure used to seal off the walls of a well pipe is known as a packer and generally comprises an expandable portion that is activated from a non-expanded size, permitting it to freely pass through the bore hole of the well pipe, to a radially enlarged size that accomplishes the desired sealing engagement.

Such packer structures in the prior art comprise a variety of component parts. Generally, however, the packer parts include a combination of metallic and resilient components. One common type includes an expandable segment metallic ring surrounded by a resilient packer sleeve. Another common type includes telescoping metallic parts that squeeze together to cause an intermediate resilient packer element to expand radially.

Many of these structures include top and bottom facing elements one or both of which include sloping or irregular contours. These surfaces assist in achieving effective sealing between components. An example of a structure including components with contoured facings is shown in U.S. Pat. No. 3,195,645, disclosing annular ring elements 28 and 30 with cone-shaped faces.

Such contoured surfaces generally permit a slight longitudinal movement of the expandable component as it radially expands and such structure involves two mating surfaces that are similarly contoured.

Although such a structure permits a uniform and even contact between the mating parts, components at least partially made of resilient or conformable material, operating under the high pressure conditions to which they are often subjected, are not protected by such a design. In fact, such a design in many cases accelerates the wear on such components and even on occasion promotes malfunctioning.

Such wear and malfunction results from the expansion of the resilient component in operation. Once the resilient material has expanded to contact the well pipe, further expansion is restricted by the well pipe and by the upper and lower mating surfaces. Under further compression, the resilient material will tend to extrude vertically along the well pipe wall, thereby degrading the structural integrity of the material.

It is therefore a feature of this invention to provide an improved well pipe packer assembly which minimizes the extrusion of resilient components therein when the packer is expanded in place.

It is another feature of this invention to provide an improved well pipe packer assembly which causes resilient components therein to expand radially without overlapping the non-resilient components between the packer and the wall of the well pipe or between segmented parts of expanded non-resilient components.

It is still another feature of the invention to provide an improved well pipe packer assembly including a washer that does not deform under operating pressure nor break or chip under such pressure.

It is still another feature of the invention to provide an improved well pipe packer assembly including a washer having one sloping surface to prevent an adjacent resilient packer component from undergoing peripheral extrusion and having a second sloping surface for expanding a segmented packer ring, thereby retarding vertical extrusion of the resilient packer component under high pressure conditions.

SUMMARY OF THE INVENTION

A well pipe packer apparatus is provided for effectively sealing the well pipe. The apparatus includes a combination of devices for preventing vertical extrusion of the resilient packer component under a wide range of pressures.

The packer apparatus preferably includes a washer which surrounds a central tool stem and which has upper and lower sloping surfaces. Such washer further possesses hardness qualities such that the washer maintains its shape, i.e., does not materially deform, nor does it break or chip, under operating conditions.

The resilient packer section has a facing surface adjacent an inwardly sloping surface of the washer which, in the absence of a supplied packer pressure (such as by the inward telescoping of non-resilient parts against the resilient section), is substantially straight across (or, at least, closer at the outer dimension of the sloping surface of the washer than at its inner dimension).

An outwardly sloping surface of the washer abuts an inwardly sloping surface of a radially expanding segmented packer ring such that motion of the washer toward the packing ring causes a camming action, resulting in expansion of the packer ring radially against the well pipe wall.

A material for the washer which satisfies structural rigidity and brittleness requirements is non-heat treated 4140 steel.

BRIEF DESCRIPTION OF THE DRAWINGS

So that the manner in which the above-recited features, advantages, and objects of the invention, as well as others, which will become apparent, are attained and can be understood in detail, a more particular description of the invention briefly summarized above may be had by reference to the embodiments thereof illustrated in the appended drawings, which form a part of this specification. It is to be noted, however, that the appended drawings illustrate only typical embodiments of the invention and are not to be considered limiting of its scope, for the invention may admit of other equally effective embodiments.

In the drawings:

FIG. 1 is a cross sectional view of a preferred embodiment of a packer assembly in accordance with the present invention, and FIG. 2 is a cross sectional view of a preferred embodiment of the washer component of the invention illustrated in FIG. 1.

DESCRIPTION OF PREFERRED EMBODIMENT

Referring to the drawings, FIG. 1 illustrates a packer assembly in accordance with the present invention in place within wall 10 of a well pipe section. The packer assembly includes several components depending from a test tool 12, which is exemplary of various bore hole tools that may be employed with a packer assembly. The various components are connected to and are held in conjunction with tool stem 14 depending from test tool 12.

At the lowermost part of the packer assembly, heel nut 16 is secured to the threaded end of tool stem 14 via accomodating internal threads thereon. A beveled washer 18 is supported by heel nut 16. Above washer 18, and in abutting contact therewith, is radially expanding segmented packer ring 20. Anti-extrusion and segment ring actuating washer 22 is mounted above packer ring 20 and in abutting contact therewith. In ascending order above washer 22 are hard resilient packer component 24, soft resilient packer component 26, hard resilient ring component 28, and metallic sleeve 30.

It is apparent that at the juncture of packer component 24 and washer 22 a gap is formed which becomes wider towards the inner diameter of washer 22. This aspect of the design results from the fact that the bottom surface of packer component 24 is substantially flat, i.e., transverse to the direction of tool stem 14, while the upper surface of washer 22 slopes downward towards the center of washer 22.

It should also be noted that the lower surface of washer 22 slopes downward with the same angle at which the upper surface of packer ring 20 slopes downward. Thus the mating contact of washer 22 with packer ring 20 is uniform over the abutting surfaces thereof.

In operation, sleeve 30 is moved along tool stem 14 toward heel nut 16. This contraction causes the softest resilient material in the combination to squeeze out in a lateral direction to a greater extent than the other resilient components in the combination. Hence, component 26 is pressed against the internal wall of well pipe 10. To some extent, however, resilient components 24 and 28 are also laterally expanded. It may be assumed that the expansion of all three components combines to effectively seal the wall of well pipe 10 with respect to the packer assembly, thereby sealing off the space between test tool 12 and the wall of well pipe 10 from the space below the packer assembly within well pipe 10.

As discussed in my co-pending application, Ser. No. 814,290, in operation there will be a certain tendency for resilient packer component 24 to extrude vertically down the wall of well pipe 10 where such a component is in abutting contact with the packer elements immediately above and below it. This extrusion is inhibited by the reverse beveled design of the upper surface of washer 22 in the present invention. By allowing some expansion into the space created by the reverse beveled surface, the design of the upper surface of washer 22 prevents vertical extrusion of the hard resilient packing material 24 and thereby prevents breakdown of that packing material and excess wear due to such extrusion. This design is effective in preventing detrimental extrusion of resilient packer components up to a pressure of about 10,000 PSIG.

For pressures above 10,000 PSIG to approximately 20,000 PSIG, radially expanding segmented packer ring 20 establishes a back-up ring structure which expands against well pipe wall 10 to further seal the packer assembly. Such an expandable ring structure is discussed in detail in my U.S. Pat. No. 3,158,378. In the embodiment shown in FIG. 1, in operation washers 22 and 18 are forced toward each other as sleeve 30 is moved toward heel nut 16. This motion imparts a camming action to the upper and lower surfaces of packer ring 20 through the lower sloping surface of washer 22 and the upper sloping surface of washer 18, respectively. The camming action in turn forces the segments of ring 20 out towards the wall of well pipe 10. This expansion of ring 20 acts to retard vertical extrusion of hard resilient packer component 24 at higher operating pressures, typically 10,000 PSIG to 20,000 PSIG.

As discussed in my co-pending application, Ser. No. 814,290, the high pressure conditions under which a well pipe packer operates make it imperative that the material of which washer 22 is made be sufficiently rigid so as not to deform but also sufficiently ductile that it will not break, chip, or crack under pressure. One material which has been found to meet these requirements is No. 4140 steel, which is non-heat treated. Other materials which satisfy the criteria set forth above could also be utilized.

FIG. 2 illustrates a preferred embodiment of washer 22 employed in the packer assembly of FIG. 1. Washer 22 has an upper inward conical surface 32 and a lower outward conical surface 34. The design of upper surface 32 allows the extrusion of hard resilient packer material 24 into the gap between surface 32 and the bottom surface of packer material 24, thereby preventing detrimental extrusion in a vertical direction along well pipe 10. Lower surface 34 of washer 22 is adapted to slope at the same angle as the upper surface of segmented packer ring 20, thereby imparting the appropriate camming action to segment ring 20 during operation of the packer unit.

Although the foregoing description has been applied to a tool for sealing off the wall of a well pipe for test purposes, a packer assembly similar to the above may be used in conjunction with other bore hole tools or apparatus. Furthermore, a component with sloping or beveled edges, similar to washer 22, may also advantageously be employed in other packer assemblies utilizing varying combinations of expandable resilient components and segmented components that radially expand, wherever the inhibition of the extrusion of such resilient components is desirable. Other embodiments may vary the structure of the upper and lower components from the structure of test tool 12 and heel nut 16 as illustrated in FIG. 1.

While particular embodiments of the invention have been shown and described, it will be understood that the invention is not limited thereto, since many modifications will be apparent to those skilled in the art and may be made without departing from the spirit and scope hereof.

What is claimed is:

1. In combination with a packer assembly for sealing a well pipe, including
    an upper unit,
    a tool stem carried by the upper unit and depending therefrom,
    a lower unit connected to the tool stem, and
    a packer unit positioned on the tool stem between said upper and lower units, said upper unit operably connected to move toward said lower unit, thereby applying pressure to the packer unit, the improvement in a packer unit which comprises a washer surrounding the tool stem having inward and outward conical surfaces, said washer having sufficient hardness to maintain shape integrity without breaking under packer pressure;

a resilient packer section having a surface adjacent the inward conical surface of said washer, which packer surface, in the absence of applied packer pressure, is closer at its outer dimension to said inward conical surface than elsewhere, applied packer pressure thereby causing said resilient packer section to tend to extrude along said inward conical surface; and a radially expanding segmented packer ring, the outward conical surface of said washer abutting an inward conical surface of said packer ring.

2. A packer unit in accordance with claim 1, wherein said washer is made of non-heat treated 4140 steel.

3. A packer unit in accordance with claim 1, wherein said washer is located adjacent and below said resilient packer section, and adjacent and above said segmented packer ring.

4. A packer unit in accordance with claim 1, wherein said washer is thicker at its inner diameter than at its outer diameter.

5. A packer unit in accordance with claim 1, wherein the surface of said resilient packer section adjacent said washer is substantially transverse to said tool stem.

* * * * *